United States Patent
Glazer et al.

(10) Patent No.: US 9,389,706 B2
(45) Date of Patent: Jul. 12, 2016

(54) METHOD AND SYSTEM FOR MOUSE CONTROL OVER MULTIPLE SCREENS

(71) Applicant: SCREENOVATE TECHNOLOGIES LTD., Ra'anana (IL)

(72) Inventors: Joshua Glazer, Ra'anana (IL); Leonid Liansky, Maple (CA); Gilad Taase, Ra'anana (IL)

(73) Assignee: SCREENOVATE TECHNOLOGIES LTD., Ra'Anana (IL)

( * ) Notice: Subject to any disclaimer, the term of this patent is extended or adjusted under 35 U.S.C. 154(b) by 0 days.

(21) Appl. No.: 14/945,510

(22) Filed: Nov. 19, 2015

(65) Prior Publication Data

US 2016/0139692 A1 May 19, 2016

Related U.S. Application Data

(60) Provisional application No. 62/081,660, filed on Nov. 19, 2014.

(51) Int. Cl.
*G06F 3/0354* (2013.01)
*G06F 3/14* (2006.01)
*G09G 5/00* (2006.01)

(52) U.S. Cl.
CPC .......... *G06F 3/03543* (2013.01); *G06F 3/1446* (2013.01); *G09G 5/006* (2013.01); *G09G 2370/16* (2013.01)

(58) Field of Classification Search
CPC ..... G06F 3/1454; G06F 3/1423; G06F 3/147; G06F 3/04812; G06F 3/04842
See application file for complete search history.

(56) References Cited

U.S. PATENT DOCUMENTS

| | | | | |
|---|---|---|---|---|
| 7,782,274 | B2* | 8/2010 | Manning | G06F 1/1616 345/1.1 |
| 2007/0171238 | A1* | 7/2007 | Ubillos | G06F 3/0481 345/648 |
| 2009/0244087 | A1* | 10/2009 | Okano | H04W 52/027 345/589 |
| 2012/0278759 | A1* | 11/2012 | Curl | G06F 19/327 715/804 |
| 2013/0250354 | A1* | 9/2013 | Kato | H04N 1/00299 358/1.15 |
| 2016/0048635 | A1* | 2/2016 | Warner | G06F 19/321 715/704 |

* cited by examiner

*Primary Examiner* — Ricardo L Osorio
(74) *Attorney, Agent, or Firm* — Browdy and Neimark, PLLC

(57) ABSTRACT

The present invention discloses a method for coordinating computer interface presentation controlled by user interface between a source screen and at least one sink display, where the computer interface is associated with the sink screen. The comprising the steps of: tracking mouse cursor motion on the sink screen, in case mouse cursor moving beyond external monitor desktop area: sending location data to source device, coordinate of mouse cursor to source wireless mobile device by rendering mouse cursor at the source device for displaying on the device screen, in case of identifying mouse cursor moving to the external monitor desktop area from the source and stop rendering mouse cursor at the source and start rendering at the dongle for displaying mouse on the external screen.

16 Claims, 3 Drawing Sheets

METHOD AND SYSTEM FOR MOUSE CONTROL OVER MULTIPLE SCREENS

TECHNICAL FIELD

The present invention relates monitoring and controlling mouse hovering over screens.

SUMMARY OF INVENTION

The present invention provides a method for coordinating presentation of a dynamic object, controlled by user interface, between a source screen and at least one sink screen wherein screens positioned in proximity to one another and connected through wireless communication. The method comprising the steps of:
  tracking moving dynamic object motion on the sink screen on which dynamic object is currently displayed, wherein the user interface is connected to the sink device;
  in case of identifying the dynamic object moving from the boundaries of the sink screen to a source associated screen, sending data coordinates of dynamic object location at the sink screen to the source screen;
  rendering the dynamic object at the source screen and stop rendering at the sink screen;
  wherein at least one of tracking, identifying sending and rendering are performed by at least one processor.

According to some embodiments of the present invention the moving object is a cursor of computer interface.

According to some embodiments of the present invention the two screens are associated by a dongle computerized device.

According to some embodiments of the present invention the source screen is a mobile wireless device and the sink is an external display device.

According to some embodiments of the present invention the mouse interface is connected to the external display device.

According to some embodiments of the present invention the tracking is started only upon receiving an indication of extended screen mode.

According to some embodiments of the present invention this indication can received by identifying user mode selection using dedicated setting interface or by identifying pre-defined gesture.

The present invention provides a system for coordinating presentation of a dynamic object controlled by user interface controlled by user interface, between a source screen and at least one sink screen wherein the screens are positioned in proximity to one another and connected through wireless communication. The system comprised of:
  i. rendering module for rendering the dynamic object to displayed one of the screens;
  ii. motion control module for tracking moving dynamic object motion on the sink screen on which mouse cursor is currently displayed;
  iii. wherein in case of identifying is the dynamic object moving from the boundaries of the sink screen to the source associated screen, sending data coordinates of dynamic object location at the current screen, to the source screen.

According to some embodiments of the present invention the moving object is a cursor of computer interface.

According to some embodiments of the present invention the computer interface is a mouse which is connected to device.

According to some embodiments of the present invention the two screens are associated by a dongle computerized device.

According to some embodiments of the present invention the source screen is a mobile wireless device and the sink screen is an external display device and the mouse interface is connected to the external display device.

According to some embodiments of the present invention the tracking is started only upon receiving an indication of extended screen mode.

According to some embodiments of the present invention this indication can received by identifying user mode selection using dedicated setting interface or by identifying pre-defined gesture.

According to some embodiments of the present invention this indication can received by identifying user mode selection using dedicated setting interface or by identifying pre-defined gesture.

The present invention provides a method for coordinating mouse computer interface presentation on one source wireless mobile device and at least one sink external display. The method comprising the steps of:
  iv. tracking mouse cursor motion on one screen on which mouse cursor is displayed;
  v. in case of identifying mouse cursor moving towards the boundaries of the external source display area, sending data coordinates of mouse cursor location at the external source display, to source wireless mobile device by rendering mouse cursor at the source device for displaying on the device screen;
  vi. in case of identifying mouse cursor moving towards the boundaries of the external monitor desktop area from the source, stop rendering mouse cursor at the source and start rendering at the dongle for displaying mouse on the external screen;
    1. wherein at least one of the tracking, identifying, rendering is performed by at least one processor.

The present invention provides a method for coordinating computer interface presentation on one source device and at least one external display. The comprising the steps of: tracking mouse cursor motion on the screen, in case mouse cursor moving beyond external monitor desktop area: sending location data to source device, coordinate of mouse cursor to source wireless mobile device by rendering mouse cursor at the source device for displaying on the device screen, in case of identifying mouse cursor moving to the external monitor desktop area from the source and stop rendering mouse cursor at the source and start rendering at the dongle for displaying mouse on the external screen.

According to some embodiments of the present invention is provided method for coordinating computer interface presentation on one source device and at least one external display. The method comprising the steps of: tracking mouse cursor motion on the screen, in case mouse cursor moving beyond one screen area: coordinate of mouse cursor to second device screen by rendering mouse cursor for displaying on the second device screen.

These, additional, and/or other aspects and/or advantages of the present invention are: set forth in the detailed description which follows; possibly inferable from the detailed description; and/or learnable by practice of the present invention.

MODES FOR CARRYING OUT THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The term "computerized mobile device" as used herein in this application, is defined as a mobile device with capability of running applications as well as streaming multimedia data to a screen that is external to the computerized mobile device (e.g. a mobile phone or a tablet device).

The term "target external screen" as used herein in this application, is defined as a computerized device (such as a terminal, screen, TV, multimedia device including DVD, stereo, radio etc) with capability to display of provide audio and video of streaming multimedia data from a computerized mobile device (e.g. a mobile phone or a tablet device).

The term "connection" as used herein in this application, is defined as a wireless connection between computerized mobile device and target device enabling streaming/beaming data between the device.

The term "receiver module" as used herein in this application, is defined as a processing communication module embedded in a dongle device or integrated in external screen such as TV or monitor device which support managing activating and streaming multimedia application.

The term "multimedia application" as used herein in this application, is defined as application which generate images, video or sound objects, such as video application, gaming application, chatting application or advertising.

The present invention provides a method for coordinating presentation of a dynamic object controlled by user interface, between a source screen and at least one sink screen wherein screens positioned in proximity to one another and connected through wireless communication. According to some embodiments the dynamic object may be a cursor of computer interface such as a mouse. According to other embodiments the dynamic may be an object of game application moving across the screen.

The method comprising the steps of: tracking moving dynamic object motion on the sink screen on which mouse cursor is currently displayed, in case of identifying the dynamic object moving from the boundaries of the current screen to a second associated screen, sending data coordinates of dynamic object location at the current screen to the source screen and rendering the dynamic object at the second source screen and stop rendering at the current screen.

The operation of tracking, identifying sending and rendering are performed by at least one processor.

Figure 1:
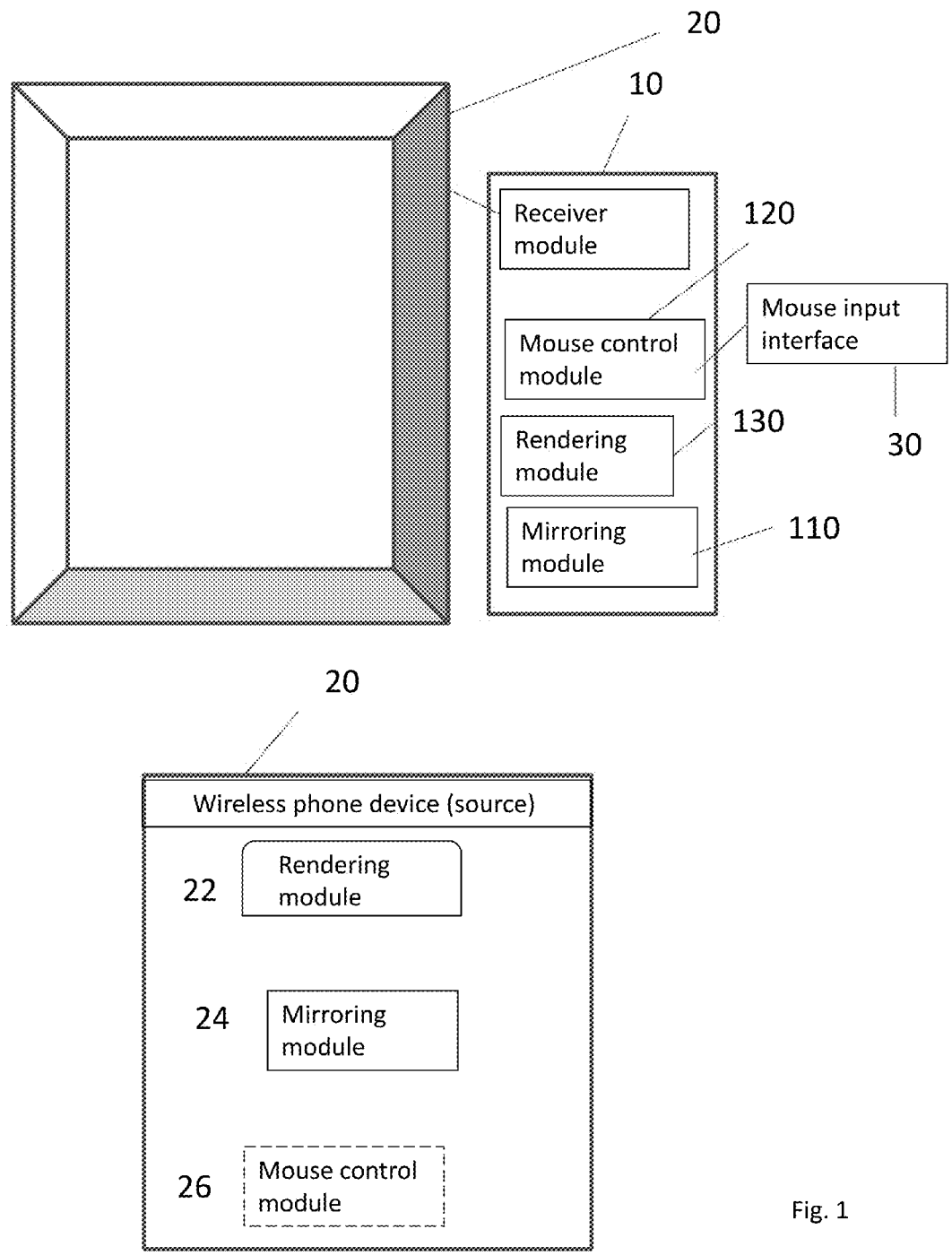
FIG. 1 is a block diagram of the system components and modules, according to some embodiments of the invention.

FIG. 1 is a block diagram of the system components and modules, according to some embodiments of the invention. The system of the present invention includes a receiver module 10 which embedded in a dongle device or integrated in external screen ("sink screen") such as TV or monitor device. The receiver module 10 interacts with a touch enabled device (source screen) 20, through wireless communication, which is designated to function as interface device for the receiver module for managing multimedia applications. This interfacing interaction is optionally enabled by mirroring modules 110, 310 for streaming back the interface of the receiver module and the running application to the touch enabled device, these modules can be implemented, partly at the receiver module or the touch enabled device 20 or partly at the touch enabled device. Rendering modules 120, 130 support rending mouse cursor presentation and conveying location sensor data between the external screen and the touch enabled device, for enabling hovering the mouse cursor in-between. These rendering modules can be implemented, partly at the receiver module or the touch enabled device or partly at the touch enabled device.

The receiver module which can be integrated as part of the screen, may comprise, rendering module 130, mirroring module 110 and mouse control module 110 which interact and receive data form the mouse input interface 30.

The touch enabled device enable such as wireless phone device may include rendering module 22, mirroring module 24 and mouse control module 26, which can optionally interact with mouse input interface 30.

According to some embodiments of the present invention the receiver module and touch enabled device are communicating through direct local wireless network such as WIFI direct, or Bluetooth. Optionally the devices are connected though global wireless or wired network using cellular network or the Internet.

Figure 2:
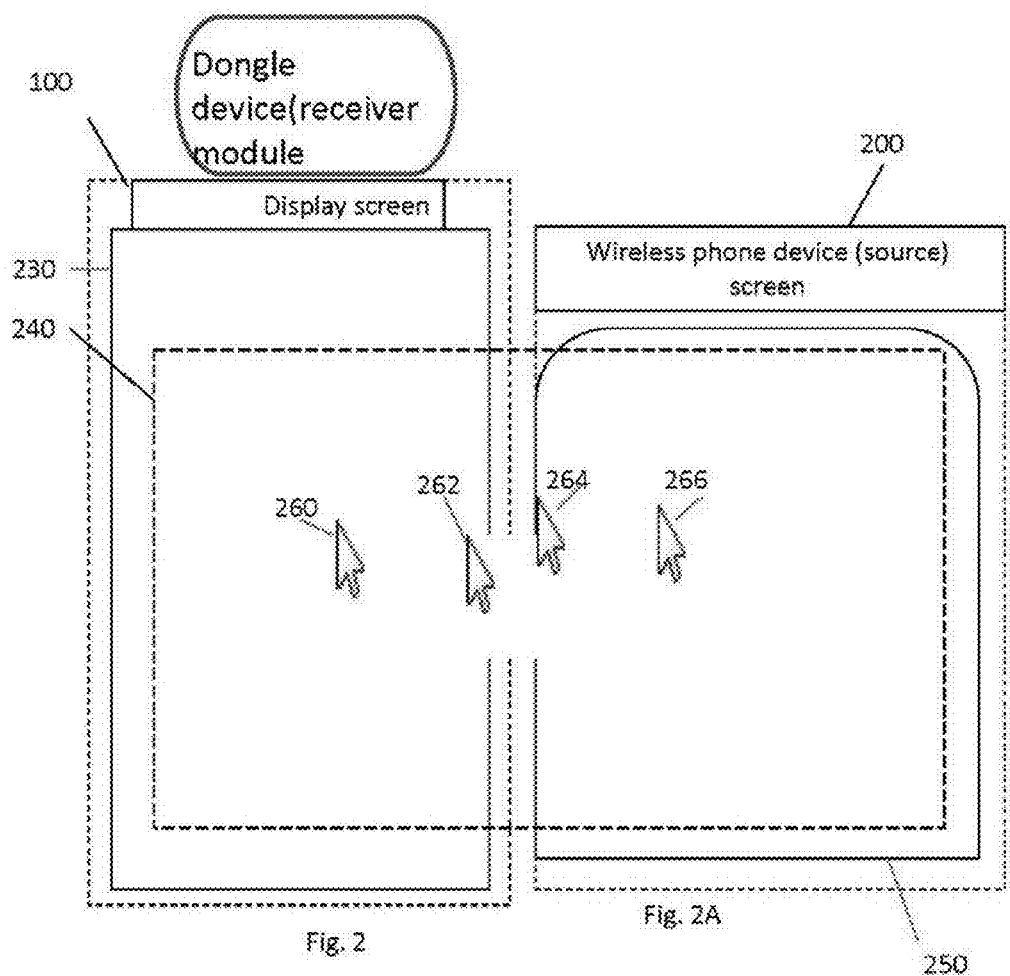
FIG. 2 a flowchart illustrating mouse hovering examples, according to some embodiments of the invention.

FIGS. 2, 2A are examples of mouse cursor hovering positions modes on the devices screen, according to some embodiments of the invention. FIG. 2 show the mouse cursor presentation at position 26 in the middle of the external screen and at the edge (boundaries) of the external screen 230 in position 262. Once the cursor is identified moving from the edge position of the external display device 262 toward the display screen of the mobile device, the cursor is to be displayed on the mobile device screen, hence creating an extendable display screen denoted by frame 240. Once the cursor presentation has been transferred to the mobile device screen it can be presented in any position on the mobile phone screen, such as positions 264, at the edge of the screen 250 and 226 in the middle of the screen.

Figure 3:
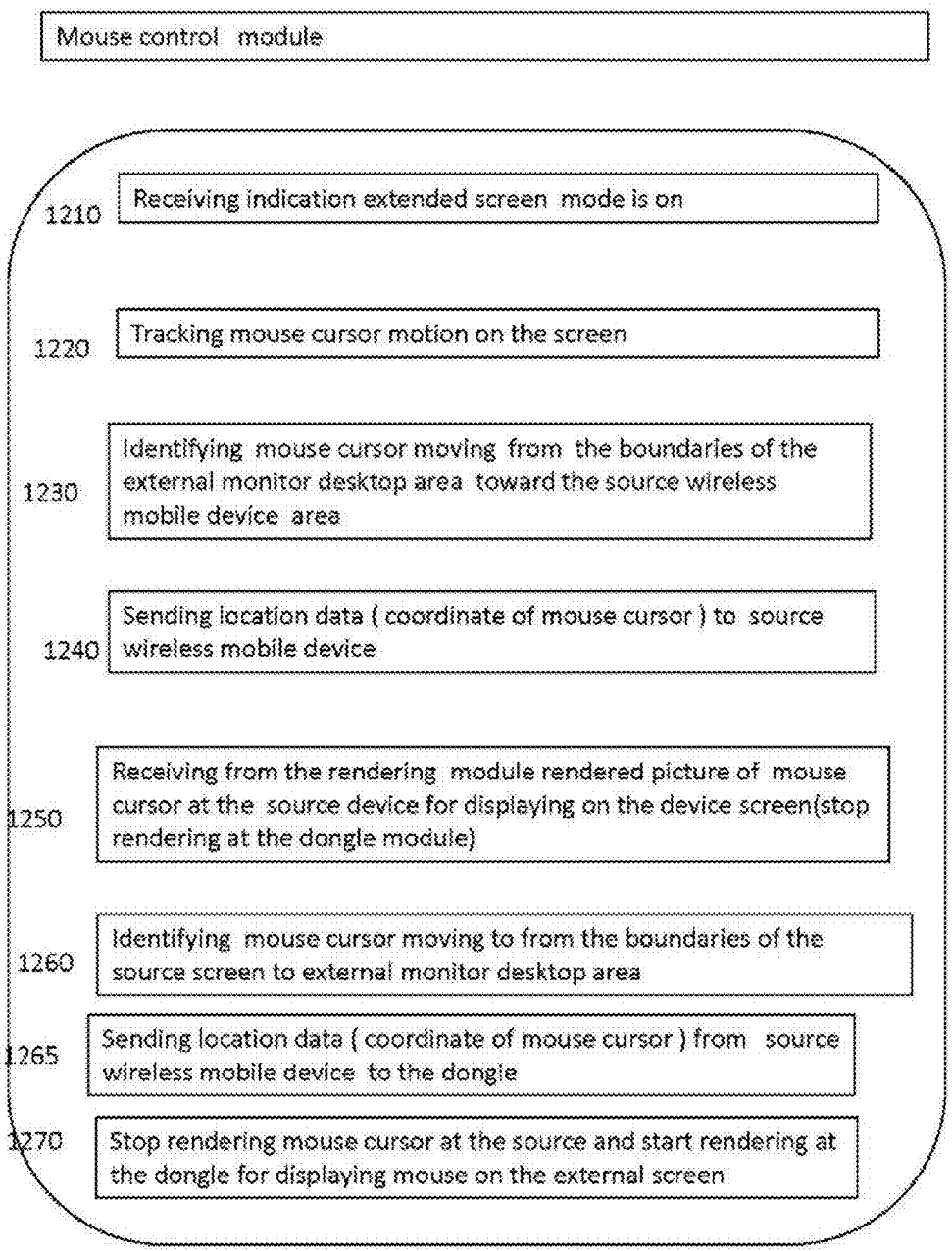
FIG. 3 is a flowchart illustrating the Mouse control module activities, according to some embodiments of the invention.

FIG. 3 is a flowchart illustrating the Mouse control module activities, according to some embodiments of the invention. The mouse control module include at least one of the following actions: receiving indication of extended screen mode is on 1210, this indication can received by identifying user mode selection by dedicated setting interface or by predefined gesture, once detected extended screen mode, the mouse cursor motion on both screen is tracked 1220 for identifying a triggering event when the mouse moves beyond the boundaries of external screen desktop area toward the mobile screen 1230, in such case the location coordinates of the cursor are sent to the wireless device 1240 and the mouse cursor is rendered by the rendering module 220 to be displayed on the screen of the mobile device 1250. In case of identifying mouse cursor moving to toward the external monitor desktop area from the boundaries of the source screen of the mobile device 1260, the module sends location data (coordinate of mouse cursor) from source wireless mobile device to the dongle (1265) and stops rendering mouse cursor at the source and start rendering at the dongle for displaying mouse on the external screen 1270.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein.

Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A method for coordinating presentation of a dynamic object, controlled by user interface, between a source screen and at least one sink screen, wherein the screens are positioned in proximity to one another and connected through wireless communication, said method comprising the steps of:

tracking moving dynamic object motion on the sink screen on which the dynamic object is currently displayed, wherein the user interface is connected to the sink device;

in case of identifying the dynamic object moving from the boundaries of the sink screen to a source associated screen, sending data coordinates of dynamic object location at the sink screen to the source screen;

and rendering the dynamic object at the source screen and stop rendering at the sink screen; wherein at least one of tracking, identifying, and rendering is performed by at least one processor.

2. The method of claim 1 wherein the moving object is a cursor of computer interface.

3. The method of claim 1 wherein the two screens are associated by a dongle computerized device.

4. The method of claim 1 wherein the source screen is a mobile wireless device and the sink is an external display device.

5. The method of claim 4 wherein the mouse interface is connected to the external display device.

6. The method of claim 1 wherein the tracking is started only upon receiving an indication of extended screen mode.

7. The method of claim 4 wherein this indication can received by identifying user mode selection using dedicated setting interface or by identifying predefined gesture.

8. A system for coordinating presentation of a dynamic object controlled by user interface, between a source screen and at least one sink screen, wherein the screens are positioned in proximity to one another and connected through wireless communication, said system comprised of:

rendering module for rendering the dynamic object to displayed one of the screens; and motion control module for tracking moving dynamic object motion on the sink screen on which a mouse cursor is currently displayed; wherein in case of identifying if the dynamic object is moving from the boundaries of the sink screen to the source associated screen, sending data coordinates of dynamic object location at the current screen to the source screen.

9. The system of claim 8 wherein the moving object is a cursor of computer interface.

10. The system of claim 9 wherein, the computer interface is a mouse which is connected to device.

11. The system of claim 8 wherein the two screens are associated by a dongle computerized device.

12. The system of claim 8 wherein the source screen is a mobile wireless device and the sink screen is an external display device and the mouse interface is connected to the external display device.

13. The system of claim 8 wherein the tracking is started only upon receiving an indication of extended screen mode.

14. The method of claim 13 wherein this indication can received by identifying user mode selection using dedicated setting interface or by identifying predefined gesture.

15. The system of claim 13 wherein this indication can received by identifying user mode selection using dedicated setting interface or by identifying predefined gesture.

16. A method for coordinating a mouse computer interface presentation on one source wireless mobile device and at least one sink external display, said method comprising the steps of:

tracking mouse cursor motion on one screen on which mouse cursor is displayed; in case of identifying a mouse cursor moving towards the boundaries of the external source display area, sending data coordinates of mouse cursor location at the external source display to source wireless mobile device by rendering mouse cursor at the source device for displaying on the device screen; in case of identifying the mouse cursor moving towards the boundaries of the external monitor desktop area from the source, stop rendering the mouse cursor at the source and start rendering at the dongle for displaying the mouse cursor on the external screen; wherein at least one of the tracking, identifying, and rendering is performed by at least one processor.

\* \* \* \* \*